(12) United States Patent
Van Den Aker

(10) Patent No.: US 7,927,444 B2
(45) Date of Patent: Apr. 19, 2011

(54) METHOD AND DEVICE FOR FORMING A LONGITUDINAL FIBER WEB

(75) Inventor: Martinus Cornelus Adrianus Van Den Aker, Tilburg (NL)

(73) Assignee: Beiler Beheer B.V. (NL)

( * ) Notice: Subject to any disclaimer, the term of this patent is extended or adjusted under 35 U.S.C. 154(b) by 1105 days.

(21) Appl. No.: 11/659,757

(22) PCT Filed: Jul. 19, 2005

(86) PCT No.: PCT/NL2005/000524
§ 371 (c)(1),
(2), (4) Date: Feb. 8, 2007

(87) PCT Pub. No.: WO2006/016801
PCT Pub. Date: Feb. 16, 2006

(65) Prior Publication Data
US 2009/0114306 A1    May 7, 2009

(30) Foreign Application Priority Data
Aug. 9, 2004    (NL) .................................... 1026809

(51) Int. Cl.
*B32B 5/00*    (2006.01)

(52) U.S. Cl. .................................... 156/178; 428/295.4

(58) Field of Classification Search ............... 156/178, 156/181, 324; 442/185, 186, 187, 188, 208, 442/226, 227, 234; 280/728.1, 730.1, 730.2; 383/3; 428/34.1, 34.3, 34.5, 34.6, 34.7, 35.7, 428/35.9, 36.1, 36.2, 36.91, 295.4; 139/305, 139/306, 383 R, 384 R, 387 R
See application file for complete search history.

(56) References Cited

U.S. PATENT DOCUMENTS
2003/0070745 A1    4/2003    Van Den Aker

FOREIGN PATENT DOCUMENTS
EP    0485892 A    5/1992
JP    07040341      2/1995

OTHER PUBLICATIONS
International Search Report dated Jan. 20, 2006 for corresponding PCT Application No. PCT/NL2005/000524.

*Primary Examiner* — Arti Singh-Pandey
(74) *Attorney, Agent, or Firm* — Ryan A. Schneider, Esq.; Troutman Sanders LLP

(57) ABSTRACT

A method is described for forming a longitudinal fibre web (100), wherein synthetic tapes (2) with an elongated cross-sectional contour are positioned substantially parallel to each other for forming a bundle (12), wherein the tapes (2) are embedded in a matrix material (46). The tapes (2) are positioned partially overlapping each other.

28 Claims, 10 Drawing Sheets

METHOD AND DEVICE FOR FORMING A LONGITUDINAL FIBER WEB

BENEFIT CLAIMS

This application is a US National Stage of International Application No. PCT/NL2005/000524, filed 19 Jul. 2005, which claims the benefit of NL1026809, filed 9 Aug. 2004.

The present invention relates in general to a method for forming a longitudinal fibre web, wherein substantially mutually parallel synthetic fibres are embedded in a carrier matrix, also of synthetic material, wherein the longitudinal direction of the fibres is directed parallel to the longitudinal direction of the web.

More particularly, the present invention relates to a method for forming such a web in a continuous process, whereby the length of that web may in principle be infinitely large; such a web will hereinafter be indicated by the phrase "continuous" web.

Manufacturing a longitudinal fibre web in a continuous process is known per se. By way of example, reference is made to the Dutch patent 1014995 and the International patent application PCT/NL01/00316 (WO01/083345), of which publications the full content is incorporated here by reference. Basically, this means that a fibre bundle is applied to or embedded in a carrier layer of a material with a lower flow temperature. The structure thus formed is subjected to a thermal treatment, usually with the use of thermal rollers, wherein the combination of carrier layer and fibres is heated to a well-controlled temperature in a temperature range which is chosen such that the carrier layer will flow but the fibre bundle will not. A good adhesion between the fibres and the liquid carrier material comes into being. In the embodiment of the said publications where the fibres are embedded between two carrier layers, after cooling down, the two carrier layers are melted together to a whole that is indicated as carrier matrix. The product formed is subsequently wound on a roll.

It is possible to make a transverse fibre web out of such a longitudinal fibre web by cutting pieces of the longitudinal fibre web and combine them again with each other in an orientation rotated over 90° (or another suitable angle). It is also possible to make a cross fibre web by attaching pieces of longitudinal fibre web rotated over an angle of 90° (or another suitable angle) to a longitudinal fibre web.

Such webs have properties making them particularly suitable as material for manufacturing for example airbags, bullet proof vests, so called "big bags", geotextile, primary backing for carpets, thermally deformable plates, etc. Those properties relate to a combination of inter alia large tensile strength and large flexibility. The strength is provided by the fibres, whereas the primary function of the carrier matrix is supplying a manageable product.

A first specific aspect of the present invention relates to providing the fibres which form the starting point for the said fibre bundle. It is common that these fibres are manufactured by a fibre producer, typically by means of an extrusion process, wherein the fibre formed is wound on a fibre reel. The fibre manufacturer supplies fibre reels to the fibre web manufacturer as stock rolls. For the manufacturing process of a fibre web, the fibre web manufacturer mounts a large number of such stock rolls on a yarn rack.

Some disadvantages are associated with this common method. The necessary steps of winding on reels, transport of the reels, and storage of the reels are considered disadvantages which also involve a cost problem. Moreover, the length of the fibre on a reel is not infinite, and an empty reel will have to be replaced while the production of the fibre web continues. During the time required for replacing a fibre reel, a fibre is thus missing in the web formed, which implies a weaker spot; this problem is all the larger as multiple fibre reels become empty at the same time, and the web parts concerned may be considered as waste. Alternatively, one usually chooses to replace all reels at the same time, also the reels that are not yet empty, which thus means that the fibres remaining on those reels are considered as waste. Further, it is then a problem that it is difficult to connect the web parts without variations in the properties: usually, the consequence is that the webs formed have a finite length.

Thus, it is necessary to make sure that becoming empty of the fibre reels is detected as soon as possible, for example by continuous supervision by personnel and/or special detection apparatus.

It is an important object of the present invention to avoid the said problems.

A second specific aspect of the present invention relates to the product properties of the fibre web formed.

It is desired to be able to vary the product properties. In this context, one can think of the possibility of producing different fibre webs with mutually different product properties, but also of the possibility of producing a single fibre web with product properties varying over the web length.

The product properties may be changed in different ways. It is possible to vary the choice of material, but changing the material is a radical change, and the necessity of having multiple materials in stock increases the costs.

The thickness is also an important product property. Usually, fibres with a substantially circular cross section are used, and a fibre bundle is used of which the thickness corresponds to the thickness of a single fibre. In that case, the fibres are positioned as good as possible in a common plane, against each other (see for example WO01/083345, p. 6, 1.34-35). In that case, the centre/centre distance between two adjacent fibres is always substantially equal to the fibre diameter.

If it is desired to vary the thickness of the fibre bundle, this can be achieved by varying the fibre thickness. For obtaining a larger bundle thickness, it would in principle be possible to lay multiple fibres on top of each other, in different layers, but it is difficult to ensure that the fibres indeed remain lying in the different layers, and because of this, it is difficult to ensure the desired homogeneity. Reducing the bundle thickness is only possible by reducing the fibre thickness.

Varying the fibre thickness leads to variations in the tensile strength and in the flexibility. In particular, a larger thickness of the fibres inevitably leads to a reduction of the flexibility. Moreover, if one starts from fibres which are wound on a stock roll or yarn rack, the necessity of having multiple fibre thicknesses in stock, and the necessity of changing stock rolls, also here leads to an increase of the costs, while it is difficult or even impossible to vary the fibre thickness in a desired way over the length of the fibre web.

The tensile strength of the fibre web to be formed is mainly determined by the fibre material; the larger the fibre weight (weight per area unit of the web), the larger the tensile strength, but also the larger the costs of the fibre web. Depending on the intended application of the fibre web to be formed, a high tensile strength is not always needed, and thus the fibre weight might be lowered in order to lower costs. Lowering the fibre weight may be achieved by reducing the fibre diameter, but that is not always desired and/or not always possible.

Therefore, it is an important object of the present invention to provide a method which allows the fibre weight to be lowered in a simple way.

Further, it is an important object of the present invention to provide a method for forming a longitudinal fibre web with which it is possible in a relatively simple way to set and even, during the process, to vary the thickness of the fibre bundle in the longitudinal fibre web.

In particular, the present invention aims at providing a method for forming a longitudinal fibre web, with which it is possible in a relatively simple way to give the fibre bundle in the longitudinal fibre web a thickness which is larger than the thickness of the individual fibres.

A third specific aspect of the present invention relates to a method to increase the strength of the fibres. According to present state of the art, directly after extrusion, the fibres are subjected to a stretch treatment, causing them to become thinner and also stronger. The larger the procentual stretch, the larger the strength increase is. However, in the case of large procentual stretch, the chance of breaking also increases. An additional problem herein is that the fibres have a large velocity during the stretch treatment, which causes the chance of breaking to increase.

It is a further object of the present invention to reduce this problem.

A fourth specific aspect of the present invention relates to forming an open fibre gauze, i.e. a web comprising a first group of substantially mutually parallel first synthetic fibres and a second group of substantially mutually parallel second synthetic fibres, wherein the first synthetic fibres and the second synthetic fibres make an angle with each other which is unequal to zero. In an embodiment wherein the fibre gauze only comprises the first and second groups of fibres, this angle is preferably substantially equal to 90°. However, the invention also foresees an embodiment with a third group of substantially mutually parallel third synthetic fibres, wherein the third synthetic fibres make a first angle unequal to zero with the first synthetic fibres and a second angle unequal to zero with the second synthetic fibres, which two angles are preferably equal to each other (60°). Variations with further groups of synthetic fibres are also foreseen.

A further aspect of an open gauze is that in each group the fibres have a mutual distance, wherein the spaces between the fibres are empty, i.e. substantially free from web material, so that a gauze is permeable. These spaces will hereinafter be indicated with the phrase "pore".

Methods for manufacturing open synthetic gauze are known per se. A known method is an injection moulding method, wherein synthetic material in liquid form is inserted into a mould. This method is relatively expensive, does not lead to real fibres, is difficult to implement if it is desired to obtain thin fibres, and it is difficult or even impossible to form a continuous web with this method. The production speed is very low.

Another known method for forming an open synthetic gauze is a weaving method or a knitting method. In both cases, it is necessary to fix the fibres in order to prevent them from sliding. Further, the production speed in weaving and knitting is relatively low.

Another known method for forming an open synthetic gauze is indicated as perforation method. In this case, one starts from a synthetic foil, in which holes (the "pores") are punched. A complicated system of punching cams is needed for this. Also for this method, it applies that it is relatively expensive, does not lead to real fibres, is difficult to implement if it is desired to obtain thin fibres, and has a relatively low production speed. Further, the achieved strength is relatively low.

An important object of the present invention is to eliminate the said disadvantages.

A fifth specific aspect of the present invention relates to a method of forming hollow, foldable and inflatable bodies, for example airbags. Since the present invention relates in particular to airbags, the present invention will hereinafter be explained specifically for this application example, but it is noted with emphasis that this can not be regarded as limitation of the scope of the invention.

The material of an airbag must have various characteristic properties. In the first place, it must be able to be folded to a small packet, in order to be accommodated in a small space such as for example in a steering wheel. Further, it must be air-tight, in order to be able to be inflated, and it must be flexible enough to be able to then unfold quickly to an inflated balloon. Then, it must be strong enough to be able to withstand shock loads. It must be able to maintain all these properties in the folded state for years. Synthetic fibres can offer these properties.

In a known method for manufacturing ah airbag, sheets of synthetic fibres are formed by a weaving process. Two of those sheets are placed on each other and fixed to each other, in order to form a bag-like configuration.

In a first known variation, the sheets are subjected to a heat treatment in order to let the fibres shrink so that they also become thicker, in order to let the sheets be air-tight.

In a second known variation, a layer of a resin or a rubber is applied to the tissue formed, in order to let the sheets be air-tight.

For connecting to each other the sheets which are placed on each other, in the known manufacturing techniques, it is necessary that the sheets are sewn to each other. This is a process which requires that a stitching thread with the help of a needle is pulled through the sheets which are placed on each other, which has the inherent disadvantage that the air-tight sheets are perforated.

As further variation, it is still known to manufacture the sheets as a Jacquard double tissue.

An important object of the present invention is providing a manufacturing method that lacks the said disadvantages.

According to an important aspect of the present invention, the fibres are further processed into fibre web straight from the extruder. Thus, the steps of winding, transport, storage and placing of fibre rolls are avoided. Further, it is then possible to form a continuous web in which also the individual fibres are 100% continuous, while, if desired, it is possible to vary the fibre properties such as thickness in a controlled way over the length of the continuous web.

According to another important aspect of the present invention, the longitudinal fibre web is manufactured of fibres of which the cross section has an elongated contour.

According to a further important aspect of the present invention, the fibres in the longitudinal fibre web are positioned in such a way that they at least partially overlap each other. By increasing the amount of overlap, it is possible in a relatively simple way to increase the thickness of the fibre bundle in the longitudinal fibre web.

According to another important aspect of the present invention, the fibres are subjected to a two-stage stretching process. The first stage of the stretching process takes place before the fibres are combined with a carrier layer. The second stage of the stretching process is performed after the fibres have been combined with a carrier layer, i.e. the combination of fibres and carrier layer is stretched. This combination is heated, so that the material becomes softer, after which the second stretching operation is performed.

It has proven that hereby a larger final strength is achievable than in applying a one-stage stretching process. Further, it is an advantage that the stretching process is performed at a relatively low speed.

According to another important aspect of the present invention, the fibres are positioned with mutual intermediate space. Hereby, it is possible to form a fibre gauze.

According to another important aspect of the present invention, an open fibre gauze is formed starting from a longitudinal fibre web, wherein the fibres have been arranged on a carrier layer or embedded between two carrier layers, in which longitudinal fibre web the fibres have mutual intermediate spaces. Of a second longitudinal fibre web, which is composed in a similar way, pieces are cut which, rotated over a suitable angle, are positioned on the first longitudinal fibre web. Thus, a first layer is formed containing the first group of first fibres, and a second layer containing the second group of second fibres. If desired, a third, a fourth etc. layer may be applied.

Subsequently, the webs placed on each other are subjected to a heat treatment, wherein the webs melt together. More particularly, the carrier layers will melt.

Before, during or after the heat treatment, the carrier layers between the mutually crossing fibres are removed in order to thus form open pores. This phenomenon may occur automatically as a result of the heat treatment, because the film-shaped carrier layers become liquid and collapse as a result of the surface tension. Possibly, the carrier layers are perforated in a separate treatment, for example with a mechanical tool or with the aid of an air jet.

As a result of the surface tension present in the carrier layers, after collapsing or perforating, the material of the carrier layers will be pulled to the adjacent fibres, in particular to the fibre crossings, and result in a reinforcement there.

According to another important aspect of the present invention, for forming hollow, foldable and inflatable bodies, for example airbags, a closed fibre gauze is formed starting from a longitudinal fibre web, wherein the fibres have been arranged on a carrier layer or embedded between two carrier layers, in which longitudinal fibre web the fibres have mutual intermediate spaces. Of a second longitudinal fibre web, which is constructed in a similar way, pieces are cut which, rotated over a suitable angle, are positioned on the first longitudinal fibre web. The combination of these two webs is subjected to a heat treatment, causing the two carrier layers to flow into each other and a cross fibre web with a closed gauze structure to come into being. Such a cross fibre web is airtight.

Subsequently, a second cross fibre web, which has been formed in a similar way, is placed on the first cross fibre web, and sealed to the first cross fibre web along a predetermined adhesion line. In this, a strong connection comes into being, because the carrier layers melt together through and through in the spaces between the fibres. Such a way of connecting is not possible with a woven material, because the fibres lying according to an S-curve counteract a good adhesion or, if the temperature is chosen a little too high, the fibres melt together and the material formed becomes very stiff.

These and other aspects, features and advantages of the present invention will be further explained by the following description with reference to the drawings, in which same reference numbers indicate same or similar parts, and in which:

FIG. 1 schematically illustrates a process for manufacturing a longitudinal fibre web;

the FIGS. 2A and 2B are schematic cross sections of a part of a longitudinal fibre web;

the FIGS. 3A-C are schematic cross sections of a part of a longitudinal fibre web according to the present invention;

the FIGS. 4A-D are schematic block diagrams illustrating a manufacturing apparatus according to the present invention;

the FIGS. 4E-F are schematic block diagrams illustrating a preferred embodiment of a manufacturing apparatus according to the present invention;

FIG. 5A schematically shows a section of a multi-filament fibre;

FIG. 5B schematically shows a section of a mono-filament fibre;

FIG. 5C schematically illustrates the melting together of multiple fibres;

the FIGS. 6A-D illustrate a longitudinal fibre web for forming a fibre gauze;

the FIGS. 7A-D illustrate the making of a fibre gauze;

the FIGS. 8A-B are schematic cross sections of a fibre gauze during different stages of manufacturing thereof; and FIG. 9 is a schematic top view of an open fibre gauze;

Figure 1:
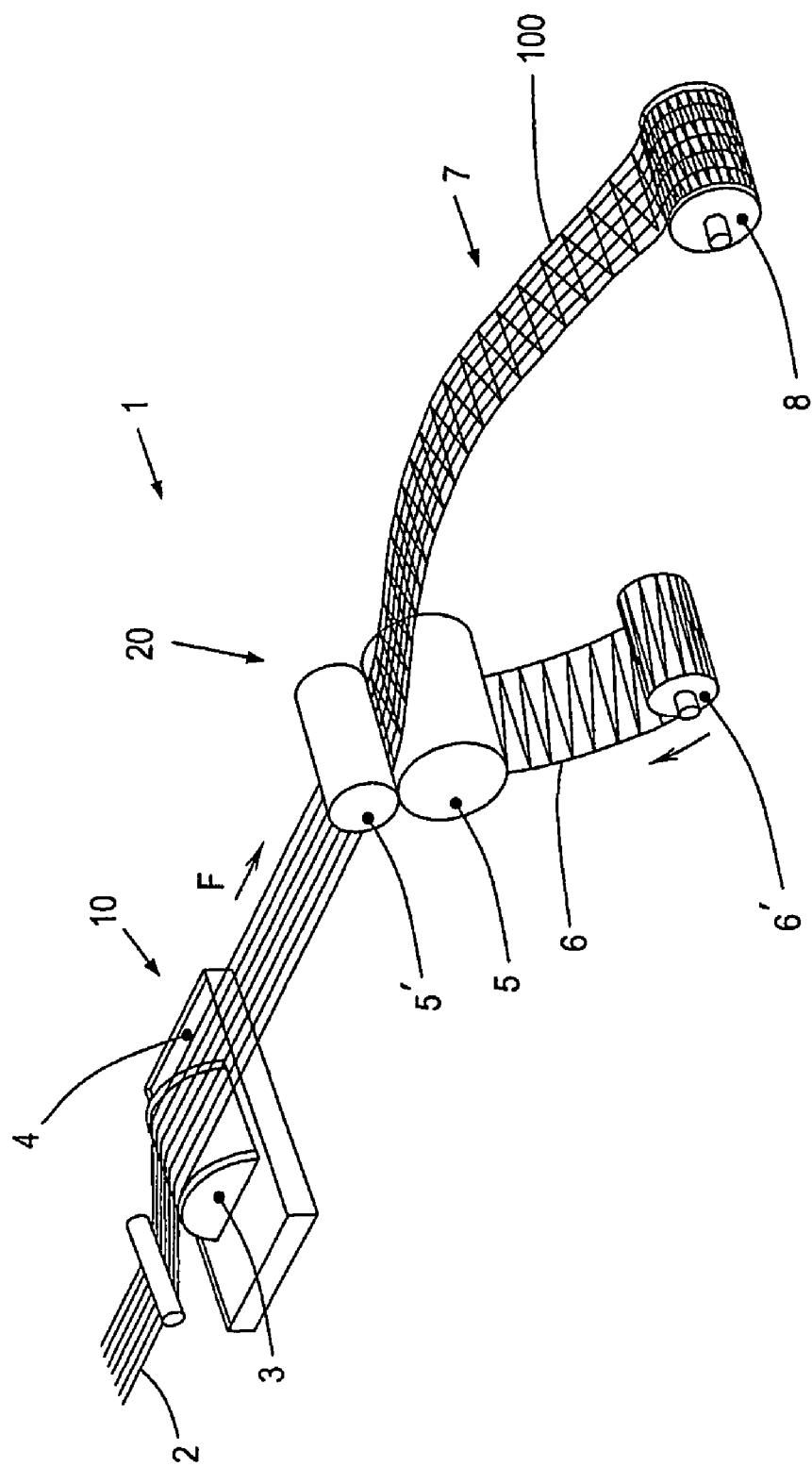

For background art relating to possible processes for manufacturing longitudinal fibre webs, reference is made to the Dutch patent 1006092 and the International patent application PCT/NL01/00316 (WO01/083345). Since such processes are thus known, an extensive discussion thereof can be omitted. For a brief illustration, reference is made to FIG. 1, which schematically illustrates a possible process for manufacturing a longitudinal fibre web 100. The web 100 is formed from fibres 2, which are held next to each other over a predetermined width relating to the total width of the web to be formed, which amounts to approximately 1.6 m in a particular embodiment. In this case, the longitudinal direction of the fibres corresponds to the longitudinal direction of the longitudinal fibre web. In principle, the fibres have a continuous length.

In an impregnation station 10 of a manufacturing machine 1, the fibres 2 are guided over an upper section of an impregnation roll 3, of which a lower section is submerged in a bath containing matrix material 4. A force F pulls the fibres 2 over the roll 3. Hereby, the roll 3 rotates through the matrix bath, wherein the role 3 always takes along fresh matrix material from the bath. The fibres are thus impregnated with matrix material.

The impregnated fibres 2, together with a substrate layer 6, are led to a combining station 20, where the impregnated fibres 2 are arranged on the substrate layer 6 by combination rolls 5 and 5'. The substrate layer 6 at least partially consists of a material which corresponds to the material of the fibres 2 or the matrix material 4. In a preferred embodiment, the fibres 2, the matrix material 4 and at least a part of the substrate layer 6 are made of a synthetic material, wherein the composition is chosen such that the material of the fibres 2 has the highest flow temperature. By a suitable choice of the temperature of the combining rolls 5 and 5', the material of the substrate layer 6 and/or the matrix material 4 flows, but the material of the fibres 2 does not.

In a drying route 7, the combination of fibres 2 and substrate layer 6 dries, after which the longitudinal fibre web 100 formed is wound on a roll 8.

Depending on the circumstances, such as choice of material, temperature, the fibres 2 of the longitudinal fibre web 100 lie on the substrate layer 6, or the fibres 2 have become completely embedded in the substrate layer 6.

Alternatively, it is possible that the matrix material 4 may be omitted if a suitable combination of materials of fibres 2 and substrate layer 6 allows a direct binding of the fibres 2 on or in, respectively, liquefied substrate layer material.

Thus, the longitudinal fibre web 100 formed has a bundle 12 of fibres 2 embedded in a matrix of synthetic material, which matrix hereinafter will be indicated by the reference number 46. In the following example, it will be assumed that the fibres 2 are completely embedded in the substrate layer 6, although it is actually not of essential interest whether the synthetic material of the matrix 46 originates from material 4 applied to the fibres 2 or from a substrate layer 6.

According to the state of the art, the fibres 2 are arranged as close to each other as possible, preferably even against each other. In an embodiment of the present invention, the fibres 2 have a predetermined mutual distance d.

Figure 2A:
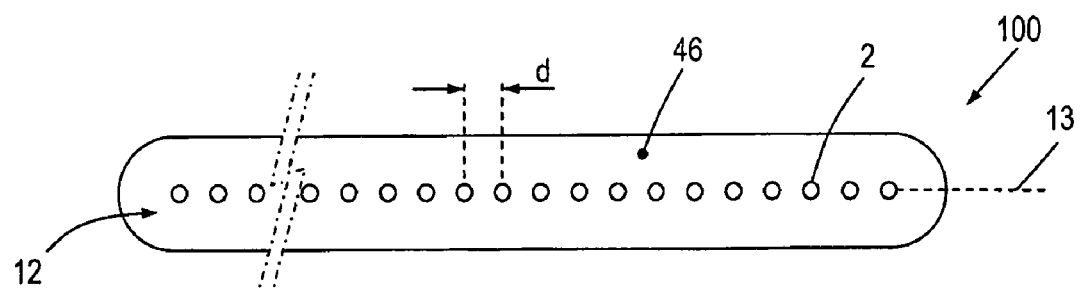

FIG. 2A is a schematic cross section of a part of a longitudinal fibre web 100, in which it is shown that the fibres 2 of the bundle 12 are situated in a common plane 13. In FIG. 2A, the fibres 2 are shown with little mutual distance d. This distance d may be varied in the machine 1, as a result of which the average fibre weight per area unit of the longitudinal fibre web is varied, which has influence on the strength of the longitudinal fibre web as a whole. However, this distance d can not become smaller than zero.

The cross section of FIG. 2A illustrates a case in which the fibres have a substantially round transverse contour. The diameter of such fibres is typically in the range of 10 µm to several millimetres.

Figure 2B:
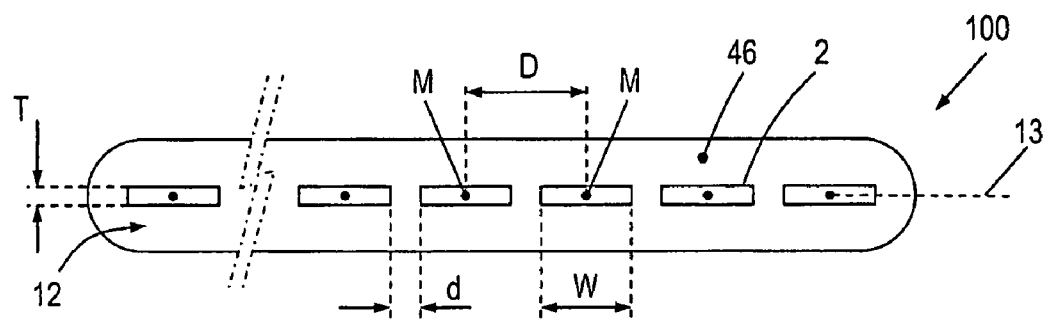

In the said International patent application PCT/NL01/00316 (WO01/083345) it is described that the fibres may also have a strip-like or ribbon-like shape, i.e. that they then have an elongated transverse contour. Known ribbon-shaped fibres typically have a thickness T in the range of 10-100 µm and a width W in the range of 1-5 mm. FIG. 5 of said International patent application PCT/NL01/00316 (WO01/083345) illustrates a possible process for manufacturing such ribbon-shaped fibres. FIG. 2B is a cross section similar to FIG. 2A of a part of a longitudinal fibre web 100, manufactured with application of ribbon-shaped fibres, which will hereinafter also be indicated as "tape". Also in this case, the tapes 2 lie next to each other in a common plane 13, wherein the lateral direction of the tapes 2 is directed parallel with that plane 13. The centres of the tapes 2 are indicated by M in FIG. 2B. In an embodiment of the present invention, the tapes 2 have a predetermined mutual distance d, so that the distance D between the centres M of adjacent tapes 2 is always larger than W: D=W+d.

Figure 3A:
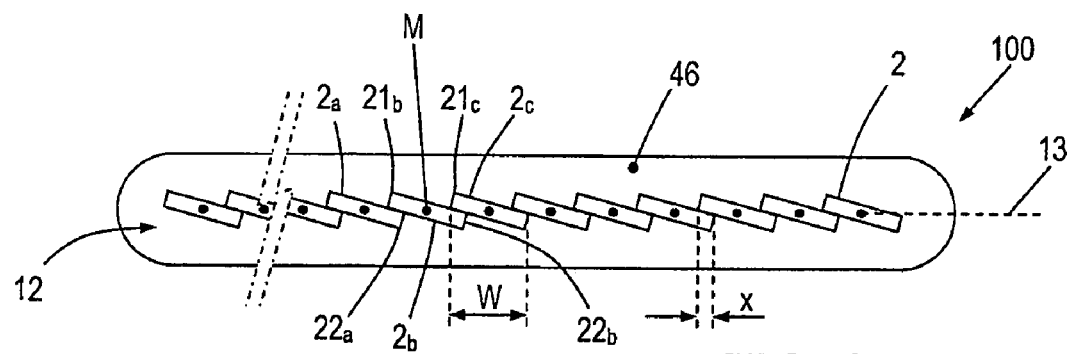

FIG. 3A is a cross section similar to FIG. 2B of a part of a longitudinal fibre web 100 according to a first special embodiment of the present invention, wherein the average distance between the centres M of adjacent tapes 2 is always smaller than the width W. The width W of the tapes 2 is for example chosen in the range of 1-5 mm, while the thickness T is for example chosen in the range of 10-100 µm. In the example shown, the centres M are again always situated in a common plane 13, but the tapes 2 partially overlap each other. More particularly, each tape 2 has two edges 21 and 22 situated opposite each other, wherein a first edge 21b of a tape 2b is situated above the second edge 22a of a first neighbour tape 2a while the second edge 22b of the tape 2b is situated under the first edge 21c of a second neighbour tape 2c. The amount of overlap x between two adjacent tapes now determines the average distance D between the centres M according to D=W−x. It will be clear that also the average fibre weight per area unit of the web 100 is determined by this. The average fibre weight is therefore simply adjustable by setting the overlap x during the production process; this overlap x may even be varied during the production process. It will be clear that this advantage is achieved while still the thickness of the bundle 12 is substantially homogeneous, certainly on a width scale larger than the width of the tapes.

It is noted that the Japanese patent application publication 07040341 describes a process for forming a sheet-shaped product from glass fibres embedded in PVC. In that known process, two groups of glass fibre bundles are formed; in that case, each bundle consists of a plurality of glass fibres. Glass fibre bundles of the different groups are positioned partially overlapping. In melting into PVC, the different glass fibres of the overlapping bundles are partially pressed between each other. According to the present invention, however, no bundles are positioned partially overlapping, but individual ribbon-shaped fibres (tapes) are positioned partially overlapping. The said publication does not describe ribbon-shaped fibres (tapes), i.e. individual fibres with an elongated, substantially rectangular cross-sectional contour.

FIG. 3A illustrates the tapes 2 as stiff strips, of which the lateral direction makes an angle with the said common plane 13. As the overlap x becomes larger, also that angle becomes larger. In an extreme situation, the overlap x is almost equal to W, and the said angle is almost equal to 90°. In that case, the tapes 2 have their lateral direction directed perpendicular to the said common plane 13.

Figure 3B:
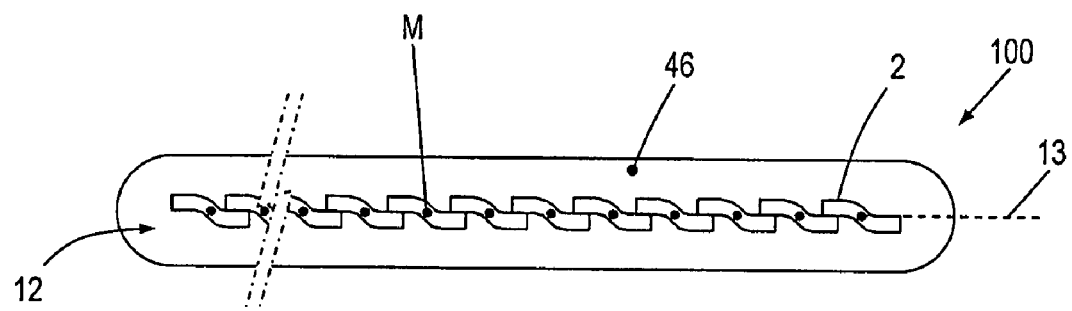

In reality, the tapes 2 are usually not stiff strips, but they are sufficiently flexible to adopt a Z-shaped contour, as illustrated in FIG. 3B.

Figure 3C:
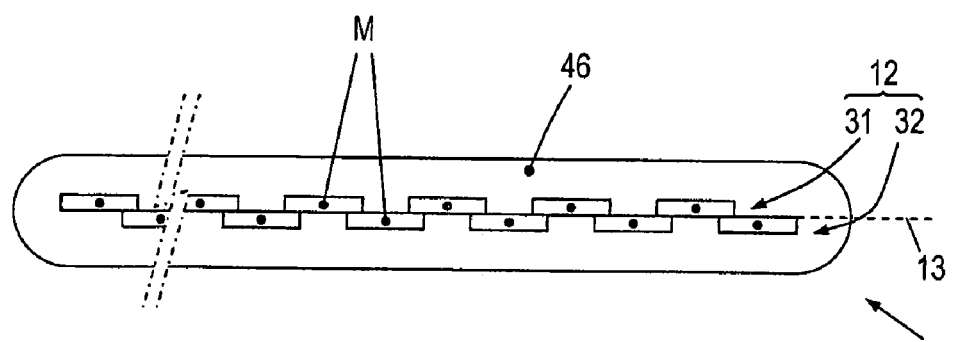

FIG. 3C is a cross section similar to FIG. 3A of a part of a longitudinal fibre web 100 according to a second embodiment of the present invention, wherein the average distance between the centres M of adjacent tapes 2 is always smaller than W. Again, the tapes 2 partly overlap each other. However, in contrast with the first embodiment, where each tape 2 with its one edge 21 always lies above its one neighbour and with its other edge 22 always lies under its other neighbour, in the second embodiment, each tape 2 always lies completely above or completely beneath its two neighbours. The centres M of successive fibres 2 therefore always lie alternatingly above and beneath a plane of symmetry 13.

In fact, the bundle 12 of the second embodiment of FIG. 3C may be regarded as a combination of two partial bundles 31 and 32 situated above each other which are mutually shifted relative to each other, wherein each partial bundle is formed as illustrated in FIG. 2B. In a further elaboration, several of such partial bundles may be arranged above each other.

The FIGS. 4A-D are schematic block diagrams illustrating another important aspect of the present invention, which aspect is not exclusively applicable to fibres with a substantially rectangular cross section (FIG. 3A-B) but also to fibres with an arbitrary transverse contour, for example a (circle-) round one. In these figures, one can always recognize the fibres 2, which in a combining station 20 are combined with a carrier layer or substrate layer 6 in order to thus form a longitudinal fibre web 100.

Figure 4A:
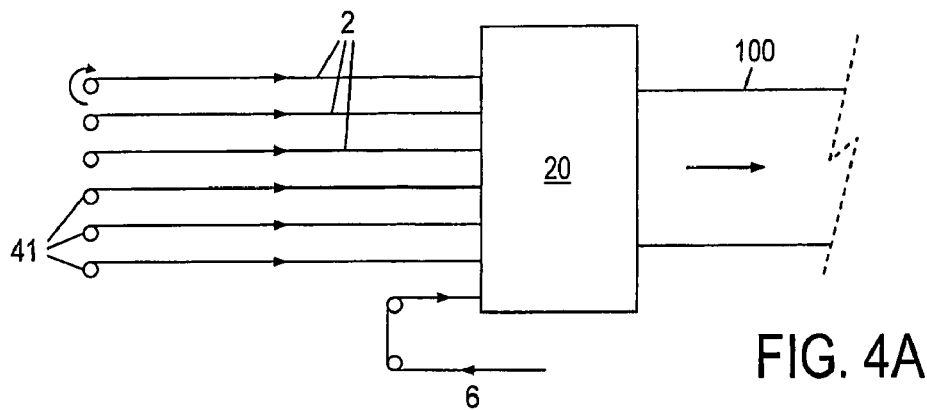

The fibres 2 may originate form fibre reels, which are schematically indicated by 41 in FIG. 4A. For each fibre 2 in the longitudinal fibre web 100 to be formed, a fibre reel 41 has to be mounted on a reel rack.

From the reels 41, the fibres 2 may be supplied straight to the combining station 20, possibly via an impregnating station which is not depicted here. However, it is also possible that the fibres 2 are subjected to a stretch treatment in a stretching apparatus 42 (FIG. 4B), causing the fibres to become stronger and thinner. Since suitable stretching apparatuses are known per se, it is not necessary here to give a description of the construction and functioning of such a stretching apparatus.

Figure 4B:
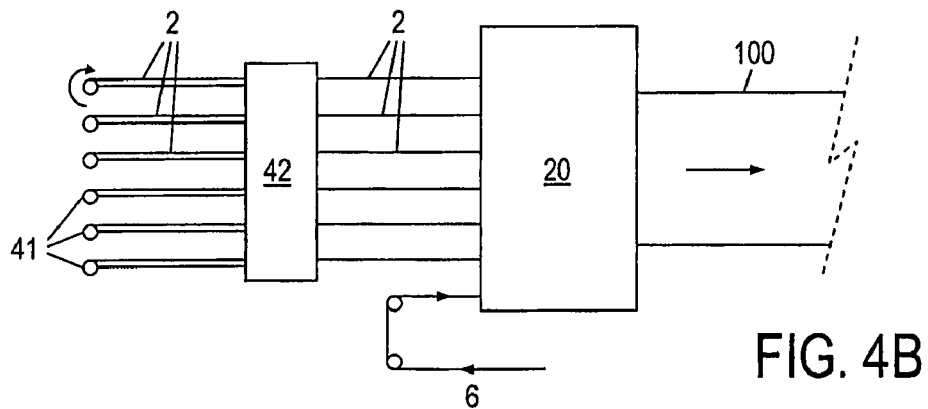
Figure 4C:
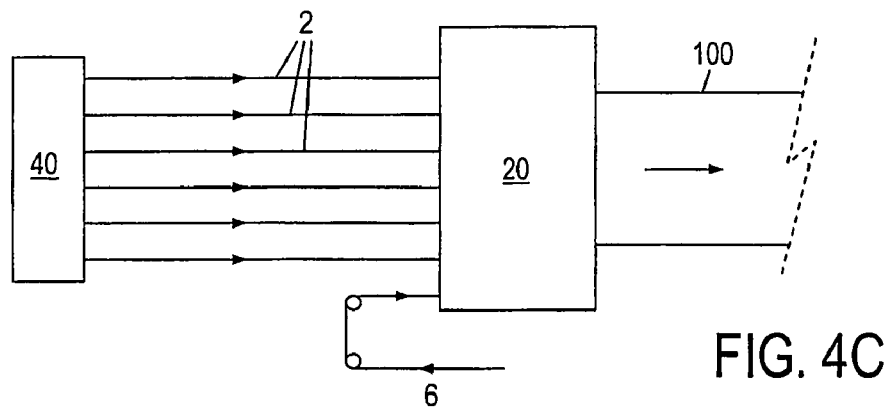

In a preferred embodiment, schematically illustrated in FIG. 4C, the manufacturing machine 1 comprises an extrusion device 40 with a plurality of extrusion openings (not shown for the sake of simplicity), which is adapted to supply a fibre 2 at each such extrusion opening. The extrusion device 40 is positioned directly in front of the combining station, so that the fibres 2 produced are guided straight from the extruding device 40 to the combining station 20. In a similar way as FIG. 4B, FIG. 4D illustrates that also in this case a stretching apparatus 42 may be positioned between the extruding device 40 and the combining station 20.

Also in this case, an impregnating station 10 may be positioned in front of the combining station 20, but in general this will not be necessary with fibres coming straight from the extruding device 40.

Figure 4D:
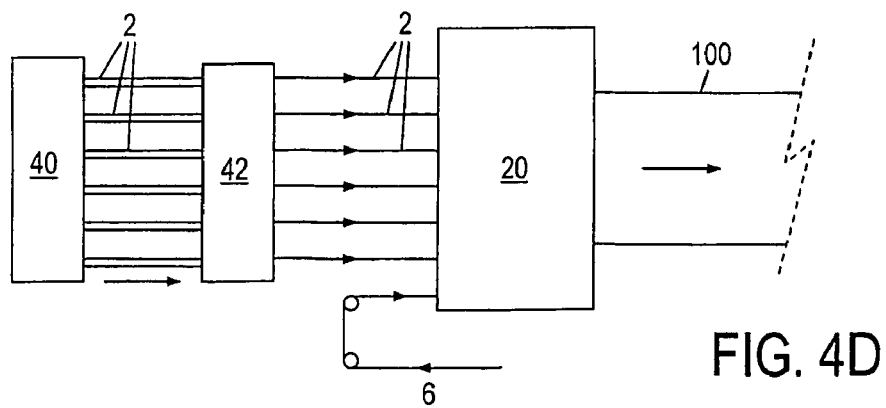
Figure 4E:
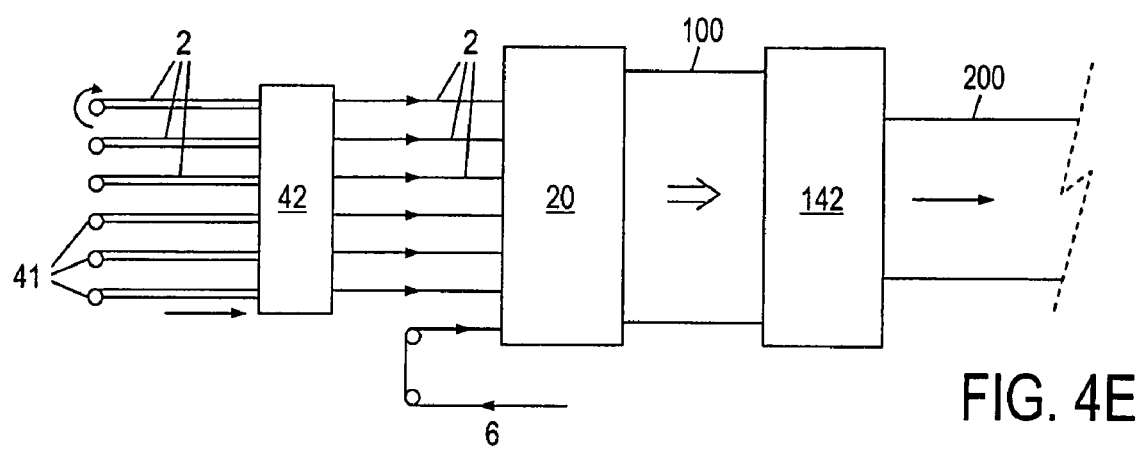
Figure 4F:
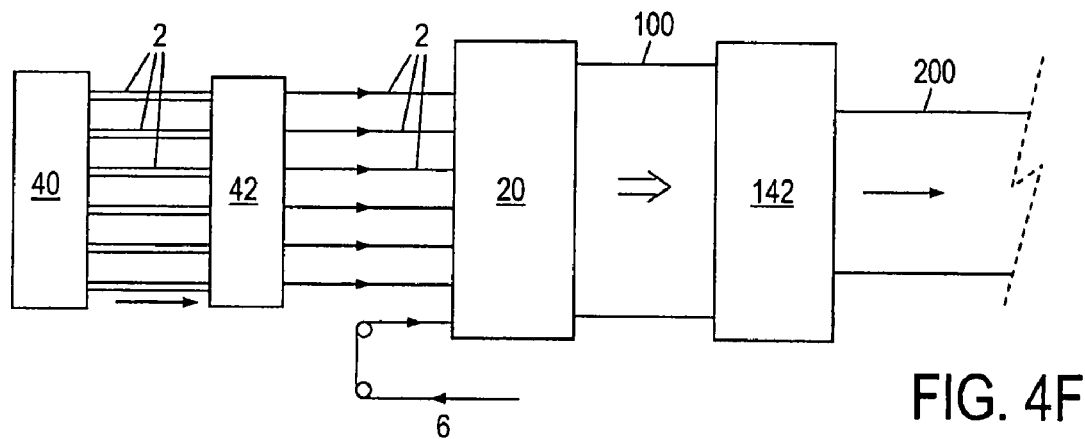

The FIGS. 4E and 4F are block diagrams similar to the FIGS. 4B and 4D, respectively, illustrating a preferred embodiment of the present invention, wherein a second stretching apparatus 142 is arranged downstream from the combining station 20, which subjects the longitudinal fibre web 100 formed to a stretching treatment. The fibres 2 of the longitudinal fibre web 100 are heated in that second stretching apparatus 142, undergo a second stretching treatment, and cool down again. By thus stretching the fibres in two stages, it is achieved that the fibres 2 get a higher strength and higher stiffness; if one would try to realize the same increase of strength and stiffness in a one-stage stretching process, then there is a considerably larger chance of breaking of the fibres.

As variation, it is also possible that the longitudinal fibre web 100, originating from the combining station 20, is first rolled up, after which the rolled-up longitudinal fibre web is later fed to a stretching apparatus in order to undergo a second stretching treatment. The longitudinal fibre web is then rolled off, heated so that the material becomes softer, stretched, and possibly rolled up again. Such a longitudinal fibre web will be indicated as a twice stretched web.

Figure 5A:
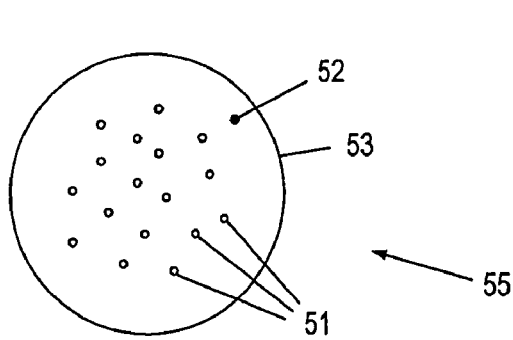
Figure 5B:
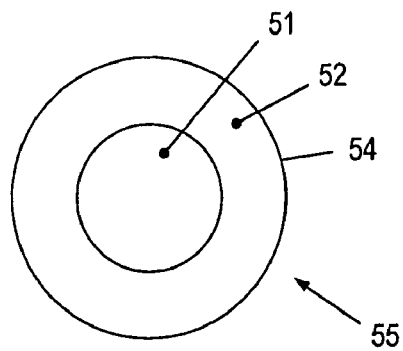

In the preceding, is has been mentioned that the fibres 2 are formed of a material having a higher melting temperature than the material of the substrate layer 6. In that case, the individual fibres may be of synthetic material, but the fibres may for example also be glass fibres, or another suitable material. In a particular preferred embodiment, each individual fibre comprises one or more filament cores 51 embedded in a fibre body 52, as illustrated in the FIGS. 5A and 5B. FIG. 5A illustrates a fibre 53 in multi-filament embodiment, FIG. 5B illustrates a fibre 54 in mono-filament embodiment. In this embodiment, each filament 51 has a higher melting temperature than the fibre body 52. In a suitable embodiment, the fibre body 52 is made of a synthetic material, for example PP, PVC, etc. The filaments 51 may be made of the same material as the fibre body 52, but the filaments 51 may also be made of another material, for example glass fibre. The FIGS. 5A and 5B clearly show that each individual fibre 53, 54 as a whole has a "solid" structure, which is here "filled" with different parts, namely filament and fibre body.

Such fibres, which will hereinafter commonly be indicated as composed fibres 55, may be formed in a relatively simple way by the extruding device 40, as will be clear to a person skilled in the art, and as will be explained hereinafter only briefly. In a first variation, the extruding device 40 only supplies the material of the fibre body 52. The extrusion openings have the shape of a ring, which surrounds a passage hole (or multiple passage holes). A pre-manufactured filament is pulled through the passage hole, and the material flowing out of the ring-shaped extrusion opening forms a sheath surrounding that filament.

In a second variation, the extruding device 40 also supplies the material of the filaments. The extruding device 40 again has extrusion openings in the shape of a ring. Each ring-shaped extrusion opening surrounds an inner extrusion opening. A first material is extruded through the inner extrusion opening, for forming the filaments 51. A second material with lower melting temperature is extruded through the ring-shaped extrusion openings, for forming the fibre bodies 53 embedding the filaments.

Figure 5C:
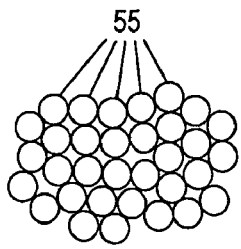
Figure 5C:
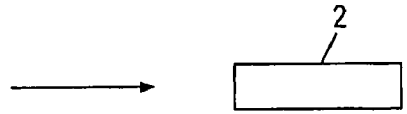

In the preceding, with reference to the International patent application PCT/NL01/00316 (WO01/083345), a possible method for forming ribbon-shaped fibres (tapes) 2 has been described. FIG. 5C schematically illustrates another possible method, wherein one starts from the composite fibres 55 described in the above, i.e. mono-filament fibres 54 or multi-filament fibres 53. In that case, a bundle of composite fibres 55 is taken (left-hand side in FIG. 5C), which bundle is subjected to a heat treatment wherein the fibre bodies 52 do melt but the filaments 51 do not. Hereby, the individual fibres 55 melt together. In a shaping step, the bundle melted to a whole is formed to a fibre 2 with a ribbon-shaped cross section (right-hand side in FIG. 5C). It is noted that this aspect of the invention may also be advantageously applied for forming fibres with a non-ribbon-shaped cross section, for example a circle-round cross section.

A ribbon-shaped fibre which is formed by letting a bundle of composite fibres 55 melt together will also be indicated as composite tape.

A method for manufacturing a fibre gauze will now be described.

Figure 6A:
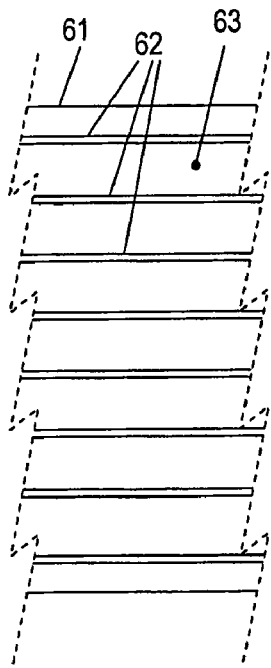
Figure 6B:
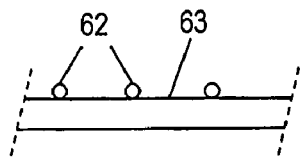
Figure 6C:
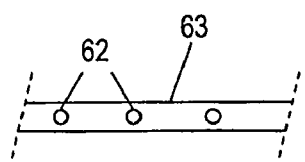
Figure 6D:
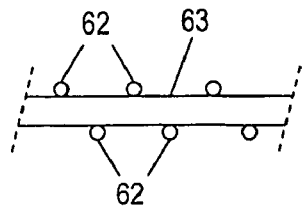

In a first step, a longitudinal fibre web 61 is formed, form example in a way as described in the preceding, with fibres 62 and a substrate layer 63. The fibres 62 are mutually substantially parallel, and have a certain mutual intermediate space. FIG. 6A is a schematic top view on a part of such a longitudinal fibre web, whereas the FIGS. 6B-6D illustrate cross sections of different embodiments of such a longitudinal fibre web. The fibres 62 may be fibres as described in the preceding, i.e. composite fibres (multi-filament; mono-filament) or substantially consisting of one single material. The diameter of the fibres may be small, in the range 1-100 μm, but the fibres may also be macroscopic fibres with a diameter in the order of 0.1 mm to more than a mm. The fibres may also be ribbon-shaped fibres (tapes). The fibres 62 may lie on a surface of the substrate layer 63 (FIG. 6B), but the fibres 62 may also be completely integrated, i.e. embedded, in the substrate layer 63 (FIG. 6C). As variation on FIG. 6B, FIG. 6D shows that the fibres 62 may be arranged on both surfaces of the substrate layer 63, wherein the fibres 62 on both surfaces are then preferably shifted relative to each other. Further, a combination of the integrated embodiment of FIG. 6C with the embodiment of FIG. 6B or 6D is possible.

Hereinafter, a longitudinal fibre web 61 according to the FIG. 6B or 6D will be indicated as a web with external fibres 62, and a longitudinal fibre web 61 according to FIG. 6C will be indicated as a web with internal fibres 62.

In the same way, a second longitudinal fibre web 71 is formed which may be identical to the first longitudinal fibre web 61 as regards to construction.

In a next step, web segments 75 are cut or sheared from the second longitudinal fibre web 71, which segments 75 are laid on the first longitudinal fibre web 61, in such a way that their fibres 72 make an angle with the fibres 62 of the first longitudinal fibre web 61. In a preferred embodiment, this angle amounts to approximately 90°, in which case also the cutting lines 74 with which said second longitudinal fibre web 71 is cut in segments 75 make an angle of substantially 90° with the longitudinal direction of that other longitudinal fibre web 71.

Figure 7A:
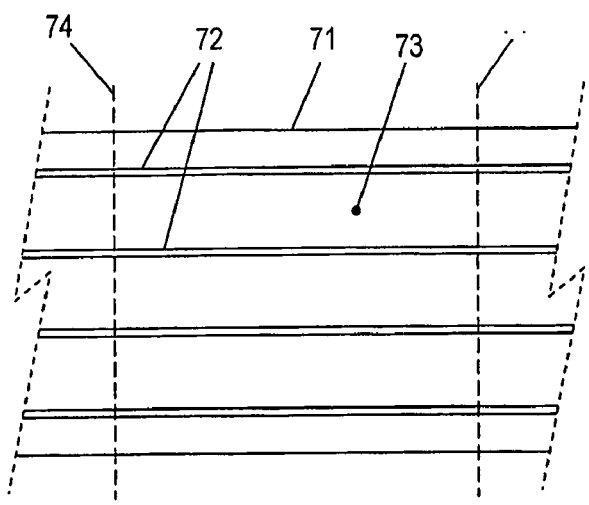
Figure 7B:
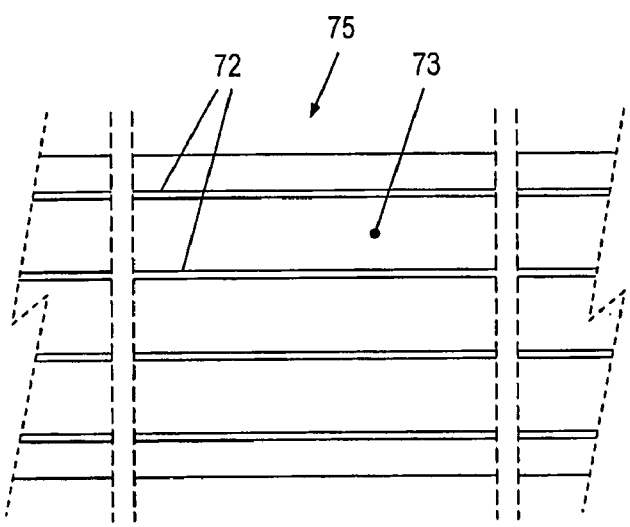
Figure 7C:
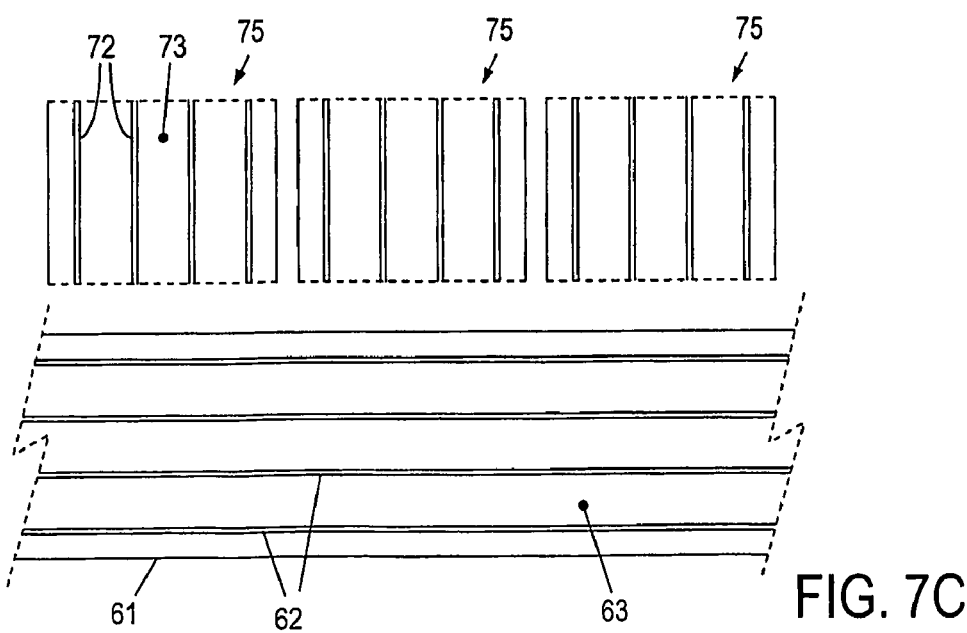

FIG. 7 is a schematic top view showing this second longitudinal fibre web, with fibres 72 and substrate layer 73 (at A; only a small number of fibres 72 is shown for the sake of clarity), which second web 71 is cut along cutting lines 74 to segments 75 (at B), which are placed on the first longitudinal fibre web 61 (at C (on smaller scale than at A and B) and D; for the sake of clarity, the segments 75 and the first longitudinal fibre web 61 are shown loose form each other in FIG. 7C).

It is noted that this second longitudinal fibre web 71 may have a construction identical to that of the first longitudinal fibre web 61, but that is not essential. It may even offer advantages if the first and second webs 61 and 71 have mutually different constructions, wherein a suitable combination of constructions and corresponding properties such as tensile strength then yields a combination product with particular desired mechanical properties.

Figure 7D:
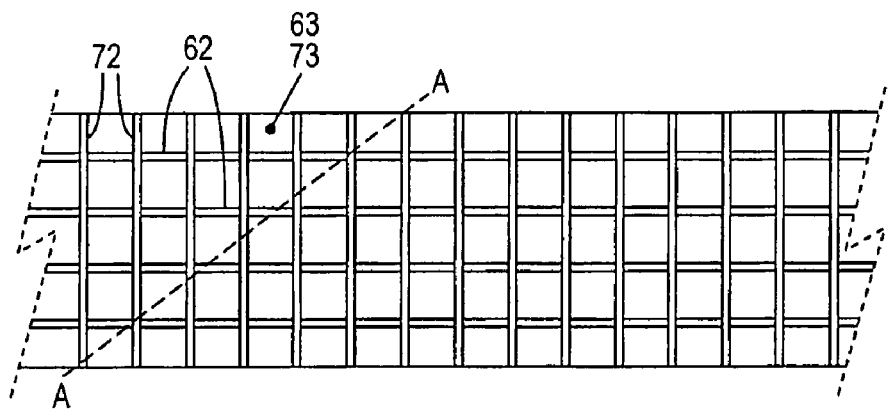
Figure 8A:
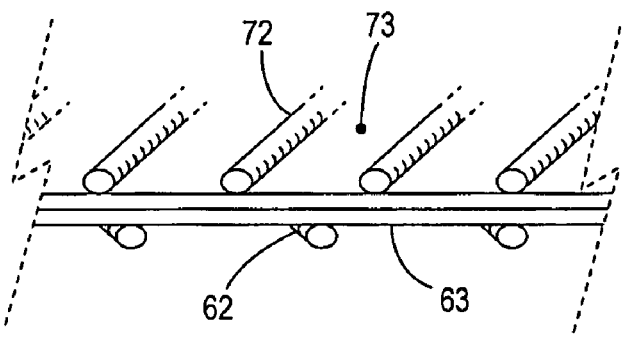

FIG. 8A is a schematic perspective section according to the line A-A in FIG. 7D, for an exemplary embodiment in which the webs 61 and 71 have external fibres 62 and 72, while the substrate layers 63 and 73 of the webs 61 and 71 are placed on each other. Alternatively, however, it is also possible that the fibres 62 and 72 are placed against each other, sandwiched between the substrate layers 63 and 73. Especially in this alternative embodiment, strong nodal points will be formed at the junctions of the fibres, because here three layers on top of each other then come into being. It is also possible that the fibres of one web (for example 71) are arranged against the substrate layer of the other web (for example 61). These alternatives are not illustrated separately for the sake of simplicity.

It may be clear that an assembly of a first longitudinal fibre web 61 with segments 75 of a second longitudinal fibre web 71 positioned transversely thereto may also be formed if the first longitudinal fibre web 61 and/or the second longitudinal fibre web 71 are implemented as type with internal fibres 62 and/or 72 (see FIG. 6C) or as type with external fibres 62 and/or 72 on both sides (see FIG. 6D).

Figure 8B:
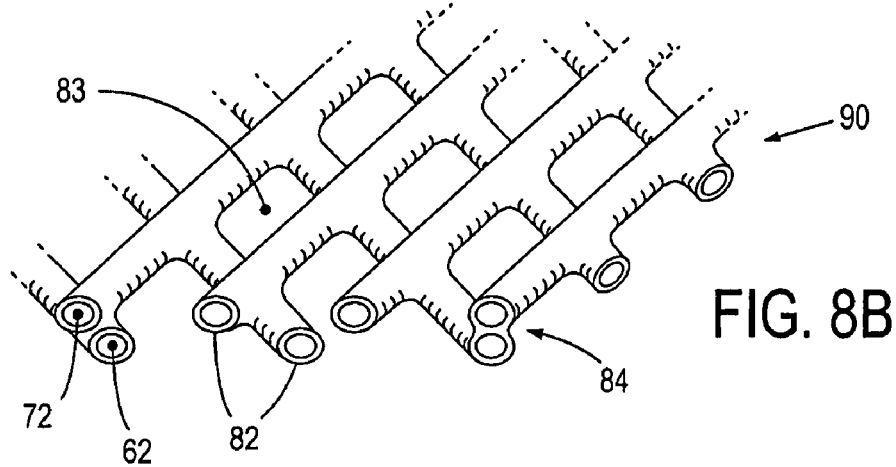

In a next step, the assembly of the first longitudinal fibre web 61 with the segments 75 of the second longitudinal fibre web 71 positioned transversely thereto is subjected to a heat treatment, which results in the carrier layers 63 and 73 melting together, while the carrier layers 63 and 73 retract from the, in this case, square spaces 83 between the fibres 62 and 72 and substantially surround those fibres (see FIG. 8B).

Depending on circumstances such as choice of material, it is possible that this melting together and retracting occurs at the same time, and it is possible that the carrier layers 63 and 73 retract from the intermediate spaces 83 without further measures being needed. However, it is preferable to provide means capable of perforating the carrier layers 63 and 73 at the positions of those intermediate spaces 83. Such perforation means may for example comprise mechanical perforation means (such as needles moving up and down), or for example a hot-air flow. Perforating may for example be performed preceding the said heat treatment, or just after that. In a preferred embodiment, the assembly of the first longitudinal fibre web 61 with the segments 75 of the second longitudinal fibre web 71 placed transversely thereon are first subjected to a first heat treatment, resulting in the carrier layers 63 and 73 melting together, subsequently, the perforation step is performed, and subsequently, the assembly which in the meantime has melted to a whole is subjected to a second heat treatment at a higher temperature than the first heat treatment, in order to accomplish that the carrier layers which in the meantime have been perforated and melted together retract from the intermediate spaces 83.

Figure 9:
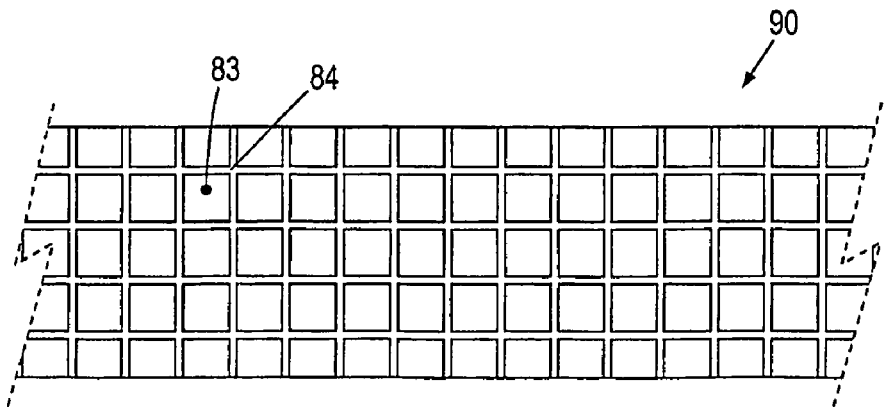

The result is an open fibre gauze 90, as illustrated in the FIGS. 8B and 9. In FIG. 8B, the material of the (former) carrier layers melted together is indicated by the reference number 82; it can be seen that the substrate layer material 82 completely surrounds the fibres 62 and 72 crossing each other (which, in practice, will not always be accomplished but is after all not necessary), wherein a reinforcement is achieved at the crossing points (for example at 84) in particular.

Hereinafter, a method for manufacturing an airbag will be described. It is noted that the invention is applicable just as well to manufacturing other hollow, foldable and inflatable bodies. In a first step, a longitudinal fibre web is formed, wherein the fibres are arranged on a carrier layer or embedded between two carrier layers, in which longitudinal fibre web the fibres have mutual intermediate spaces.

From a second longitudinal fibre web, which is composed in a similar way, pieces are cut which, rotated over a suitable angle (preferably 90°), are placed on the first longitudinal fibre web.

Figure 10:
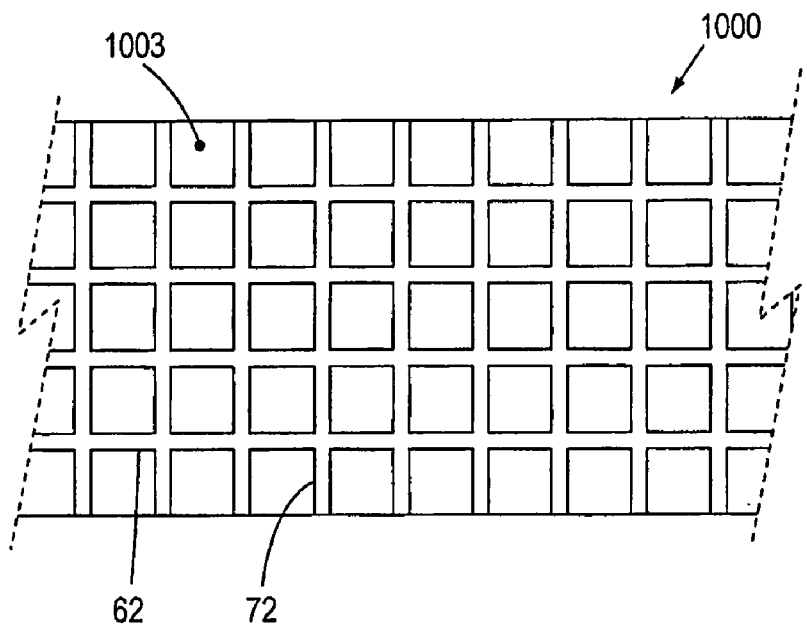
FIG. 10 is a top view similar to FIG. 9 of a closed fibre gauze.

The combination of these two webs is subjected to a heat treatment in order to melt these two webs together. Thus, a cross fibre web (cross-ply) 1000 is formed, as illustrated in FIG. 10. So far, the process may be equal to what has been discussed in the preceding with reference to the FIGS. 6A-D, 7A-D, and 8A, and these figures may just as well be regarded as illustrations with the present method, wherein the reference numbers used are maintained. In fact the only, essential, difference between the gauze 90 of FIG. 9 and the cross-ply 1000 of FIG. 10 is that the gauze 90 is an open gauze, with open intermediate spaces 83 between adjacent fibres 62, 72, while the heat treatment for melting the longitudinal fibre web 61 and the segments 75 of the transverse fibre web 71 together for forming the cross-ply 1000 is performed in such a way that the carrier layers 63 and 73 do melt together over their entire surface but otherwise remain intact. The intermediate spaces between the fibres 62 and 72, which are substantially square in the exemplary embodiment of FIG. 10, are thus filled with carrier material 1003. Thus, the cross-ply 1000 is a closed fibre gauze, that is air-tight. Such a closed fibre gauze combines the desired properties of strength and flexibility.

In a similar way, a second closed fibre gauze 2000 is formed which, as to construction and manufacturing, may be identical to the first closed fibre gauze 1000. This second fibre gauze 2000 is placed on the first fibre gauze 1000.

Figure 11:
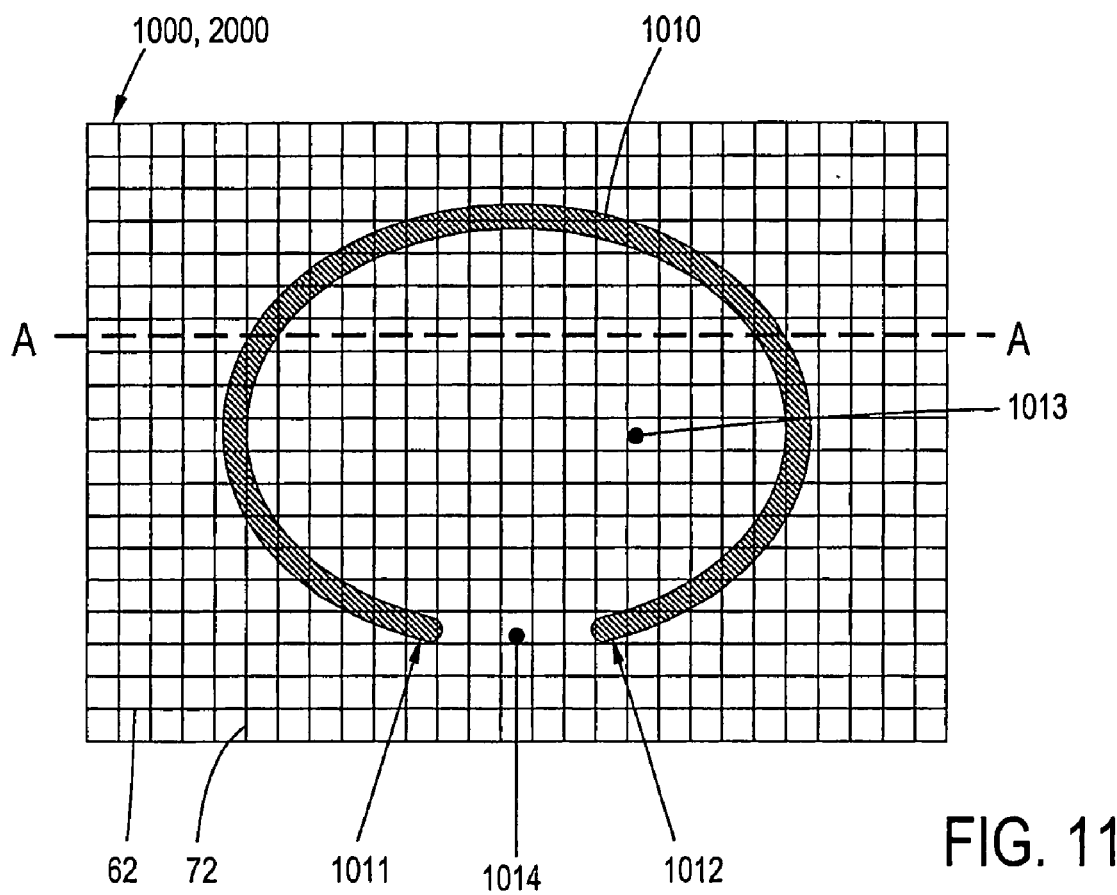
FIG. 11 is a top view illustrating an adhesion line for an inflatable body according to the present invention.

Subsequently, the two fibre gauzes 1000 and 2000 are locally subjected to a heat treatment in order to let the two fibre gauzes 1000 and 2000 locally melt together. The melting spots together define a continuous line, which will be indicated as sealing line 1010, and which, in top view, as illustrated in FIG. 11, has a curved contour with ends 1011 and 1012 lying closely together. The sealing line 1010 defines an inner space 1013 between both fibre gauzes 1000 and 2000, which inner space is completely closed off from the outside world by the gauzes 1000, 2000 and the sealing line 1010, except for an entrance opening 1014 defined by the mutual distance of the said ends 1011 and 1012.

Figure 12A:
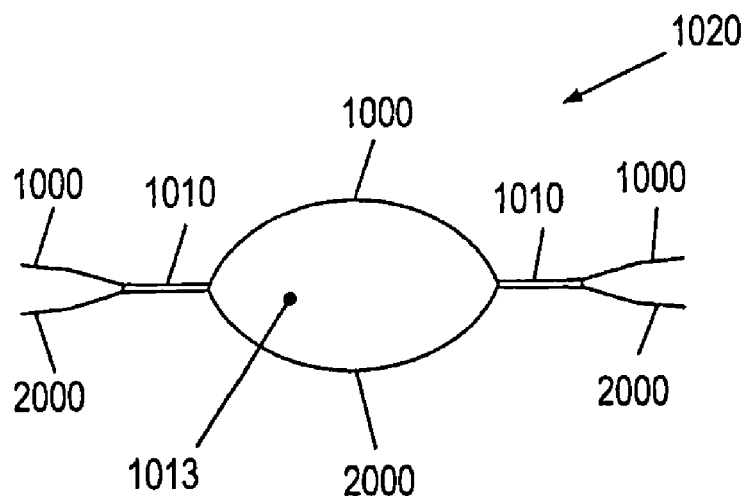
FIG. 12A is a schematic cross section according to the line A-A of the inflatable body of FIG. 11.

Air can be brought into the space 1013 through this entrance opening 1014. The gauzes 1000 and 2000 then move away from each other, but are held together at the sealing line 1010. This situation is illustrated in FIG. 12A. In general, the gauze parts outside the sealing line 1010 do not have a function; in that case, they may be cut away. What remains is an inflatable body 1020, of which the contour is mainly defined by the contour of the sealing line 1010. In the case of a driver airbag, this contour will typically be almost round. In the case of a roll-over airbag, the total contour of the inflatable body will be more elongated, and the sealing line will have a comb-shaped contour in order to define multiple mutually parallel air chambers.

Figure 12B:
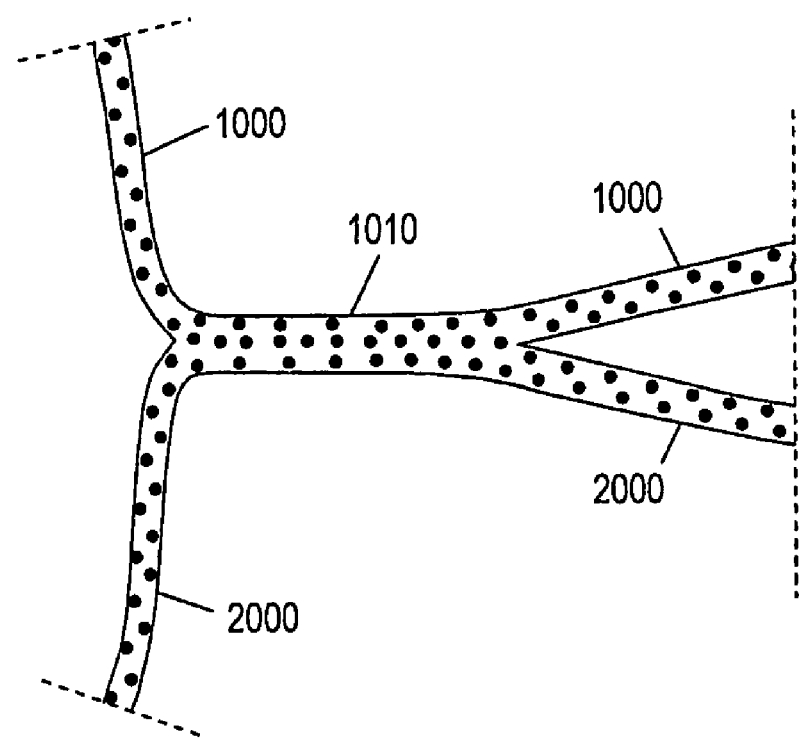
FIG. 12B shows a part of the cross section of FIG. 12A on larger scale.

FIG. 12B shows a schematic cross section of the sealing line 1010 on larger scale, in order to illustrate that at the position of the sealing line 1010, in the spaces between the fibres, the carrier layers 63, 73 of the two gauzes 1000, 2000 are melted together. A good, strong and air-tight sealing of the two gauzes 1000, 2000 is thus not obstructed by the presence of the fibres. Also, the fibres themselves are not melted together, so that the whole remains flexible.

It is noted that the above procedure may also be performed if there is little or no intermediate space 63, 73 between the fibres 62, 72, but the largest advantages are achieved if there are such intermediate spaces. Those advantages are in the field of a larger flexibility, a lower weight, and better weldability.

In a possible embodiment, the first and second gauzes 1000 and 2000 are aligned relative to each other, i.e. the fibres in the first gauze 1000 are substantially directed parallel with the fibres in the second gauze 2000. However, it is preferred that the first and second gauzes 1000 and 2000 are rotated relative to each other over, at least approximately, 45°. Then, in the area of the sealing seam 1010, there are fibres with an orientation 0°-180° and fibres with an orientation 90°-270° of the one gauze, as well as fibres with an orientation 45°-225° and fibres with an orientation 135°-315° of the other gauze. Hereby, a better stress distribution in the inflatable body in the inflated state is achieved, and there are less stress concentrations, so that the load of the sealing seam 1010 is lower. Also, more but smaller pleats come into being, and the area around the sealing seam 1010 is more flexible in the inflated state.

It will be clear to a person skilled in the art that the invention is not limited to the exemplary embodiments discussed in the preceding, but that several variations and modification are possible within the protective scope of the invention as defined in the attached claims.

For example, it is possible that a fibre bundle may comprise two or more bundles 12 of the first embodiment as illustrated in FIG. 3A or FIG. 3B on top of each other.

Further, it is possible that a cross-ply 1000 comprises multiple layers of fibre webs. In the case of three layers, it is then possible that the separate layers are rotated over 60° relative to each other. When an inflatable body is then made, the two cross-plies 1000 and 2000 may be rotated over 30° relative to each other.

The invention claimed is:

1. Method for forming a longitudinal fibre web, wherein synthetic tapes with an elongated cross-sectional contour are positioned substantially parallel to each other for forming a bundle, wherein the tapes are embedded in a matrix material; wherein the fibres are positioned partially overlapping each other.

2. Method according to claim 1, wherein the matrix material is adapted to the material of the tapes and has a flow temperature which is lower than the material of at least a part of the tapes.

3. Method according to claim 2, wherein the combination of the matrix material and the material of the tapes is subjected to a heat treatment, wherein the temperature is increased to a maximum value within a temperature range which is chosen such that the matrix material flows with certainty while the material of the tapes with certainty does not flow.

4. Method according to claim 1, wherein each tape is always positioned with its one edge above a neighbour tape and with its opposite edge beneath a neighbour tape.

5. Method according to claim 1, wherein successive tapes are always positioned in partial bundles alternatingly above and beneath a plane of symmetry.

6. Method for forming a longitudinal fibre web according to claim 1, wherein fibres are positioned substantially parallel to each other for forming a bundle, wherein the fibres are embedded in a matrix material;
wherein a fibre comprises at least one multi-filament fibre, with multiple filament cores embedded in a fibre body.

7. Method according to claim 1, wherein a fibre comprises at least one mono-filament fibre, with a filament core embedded in a fibre body.

8. Method according to claim 7, wherein a filament has a higher melting temperature than the fibre body.

9. Method according to claim 7, wherein a filament is made of the same material as the fibre body.

10. Method according to claim 7, wherein the fibre body is made of a synthetic material.

11. Method according to claim 7, wherein a filament is made of a material differing from the material of the fibre body, wherein the filament is preferably made of glass fibre or synthetic material.

12. Method according to claim 7, wherein a fibre is made by subjecting a bundle of composite fibres to a heat treatment so that the fibre bodies thereof melt together.

13. Method according to claim 12, wherein, in a forming step, the bundle of composite fibres which is melted together is formed to a tape with a substantially ribbon-shaped cross-sectional contour or to a fibre with a round cross-sectional contour.

14. Method according to claim 1, wherein the fibres are directly received from an extruding device.

15. Method according to claim 1, wherein fibres are arranged on a substrate layer, and wherein the combination of the substrate layer and the fibres is subjected to a heat treatment, wherein the temperature is increased to a maximum value within a temperature range which is chosen such that the substrate layer material flows with certainty while the material of at least a part of the fibres with certainty does not flow.

16. Method according to claim 15, wherein the fibres are composite fibres, with one or more filament cores embedded in a fibre body, and wherein the said temperature range is chosen such that the material of the fibre body flows while the material of the filament cores does not flow.

17. Method according to claim 15, wherein the fibres are subjected to a stretch treatment before they are joined together with the substrate layer.

18. Method according to claim 15, wherein the combination of the substrate layer and the fibres is heated and then subjected to a stretch treatment.

19. Method according to claim 1, wherein the fibres are positioned next to each other with intermediate spaces.

20. Method for forming a longitudinal fibre web, wherein fibres are positioned substantially parallel to each other for forming a bundle, wherein the fibres are embedded in a matrix material;
wherein a fibre comprises at least one multi-filament fibre, with multiple filament cores embedded in a fibre body.

21. Method according to claim 20, wherein a filament has a higher melting temperature than the fibre body.

22. Method according to claim 20, wherein a filament is made of the same material as the fibre body.

23. Method according to claim 20, wherein the fibre body is made of a synthetic material.

24. Method according to claim 20, wherein a filament is made of a material differing from the material of the fibre body, wherein the filament is preferably made of glass fibre or synthetic material.

25. Method according to claim 20, wherein a fibre is made by subjecting a bundle of composite fibres to a heat treatment so that the fibre bodies thereof melt together.

26. Method according to claim 20, wherein the fibres are directly received from an extruding device.

27. Method according to claim 20, wherein fibres are arranged on a substrate layer, and wherein the combination of the substrate layer and the fibres is subjected to a heat treatment, wherein the temperature is increased to a maximum value within a temperature range which is chosen such that the substrate layer material flows with certainty while the material of at least a part of the fibres with certainty does not flow.

28. Method according to claim 20, wherein the fibres are positioned next to each other with intermediate spaces.

* * * * *